Patented Dec. 19, 1939

2,183,998

UNITED STATES PATENT OFFICE 2,183,998

AZO COMPOUNDS AND PROCESS FOR COLORING THEREWITH

James G. McNally and Joseph B. Dickey, Rochester, N. Y., assignors to Eastman Kodak Company, Rochester, N. Y., a corporation of New Jersey No Drawing. Application August 16, 1938, Serial No. 225,199

18 Claims. (Cl. 8—50)

This invention relates to azo compounds and their application to the art of dyeing or coloring. More particularly, it relates to azo dye compounds containing an aryl nucleus of the benzene or naphthalene series which said aryl nucleus has a phosphoric acid ester or a thiophosphoric acid ester group attached to an aliphatic radical containing at least two carbon atoms which is joined to said aryl nucleus through an oxygen atom which is a nuclear substituent of the aryl nucleus and the application of the nuclear non-sulfonated azo dye compounds to the dyeing or coloration of organic derivatives of cellulose. Many of the azo dye compounds of our invention are characterized in that they are water-soluble.

Organic derivatives of cellulose are characterized by an indifferent affinity for the usual cotton or wool dyes, especially the ordinary water soluble dyes. This fact has largely necessitated the development of new dyes particularly adapted for the coloration of organic derivatives of cellulose. The new substantive dyes, developed in this connection, however, have, almost without exception, been water-insoluble or so water-insoluble that they are applied to the material undergoing coloration with the aid of solubilizing or dispersing agents. Our invention has as an object the elimination of the customary solubilizing or dispersing treatment by providing water soluble azo dyes suitable for the coloration of material made of or containing an organic derivative of cellulose.

A further object is to provide a process for coloring organic derivatives of cellulose wherein the dye is added to an aqueous dyebath and applied directly to the coloration of the material.

A still further object is to provide colored materials made of or containing an organic derivative of cellulose which are of good fastness to light and washing.

In order that the expression "organic derivatives of cellulose" may be clearly understood, it should be noted that typical organic derivatives of cellulose include the hydrolyzed as well as the unhydrolyzed organic acid esters of cellulose, such as cellulose acetate, cellulose formate, cellulose propionate or cellulose butyrate, and the hydrolyzed as well as the unhydrolyzed mixed organic acid esters of cellulose such as cellulose acetate-propionate, cellulose acetate-butyrate and the cellulose ethers, such as methyl cellulose, ethyl cellulose or benzyl cellulose.

The azo compounds of our invention are not restricted in their application to the coloration of organic derivatives of cellulose but likewise find application for the dyeing or coloration of wool and silk. For the coloration of these latter materials, sulfonated or unsulfonated azo dye compounds may be employed. As previously indicated, however, nuclear sulfonated compounds have not been found to be satisfactory for the coloration of organic derivatives of cellulose.

Because the compounds of our invention possess affinity for organic derivatives of cellulose, as well as wool and silk, they are of use for the union dyeing of materials, particularly textile materials or fabrics, containing an organic derivative of cellulose, cellulose acetate, for example, and a textile material such as wool or silk. These materials may be present in various combinations and proportions. To illustrate, a wool and cellulose acetate silk fabric or a wool, silk and cellulose acetate silk fabric, for example, may be dyed. Similarly, a wool and silk fabric may be union dyed.

Further, it will be understood that one or more dyes may be employed in the union dyeing operation. To illustrate, if a textile material composed of wool and cellulose acetate is being dyed, a nuclear non-sulfonated dye alone, a mixture of nuclear non-sulfonated dyes or a mixture of nuclear non-sulfonated and nuclear sulfonated dyes may be employed. Where the textile material contains an organic derivative of cellulose, a nuclear sulfonated dye alone cannot be employed for the union dyeing since such dyes have little or no affinity for organic derivatives of cellulose. Again, as well known in the art, where an organic derivative of cellulose alone, such as cellulose acetate, is being dyed, a mixture of nuclear non-sulfonated dyes may be used.

A further object of our invention, accordingly, is to provide a process for the union dyeing of textile materials containing admixtures of any two of the textile materials wool, silk and an organic derivative of cellulose.

The azo compounds of our invention, as previously indicated, are characterized in that they contain an aryl nucleus of the benzene or naphthalene series which has a phosphoric acid ester or a thiophosphoric acid ester group attached to an aliphatic radical containing at least two carbon atoms which is joined to said aryl nucleus through an oxygen atom which is a nuclear substituent of the aryl nucleus. That is to say, the phosphoric acid ester or thiophosphoric acid ester group is attached to the aryl nucleus of the benzene or naphthalene series through an aliphatic ether linkage. By a "phosphoric acid ester group" we include the phosphoric acid ester group in its free acid,

or salt form, such as

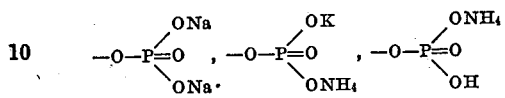

for example, as well as substituted phosphoric acid groups such as

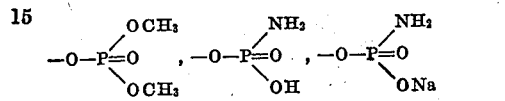

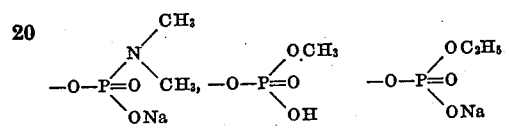

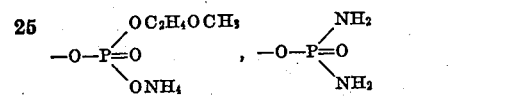

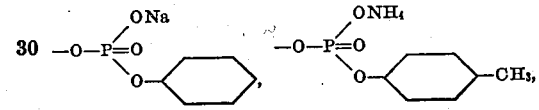

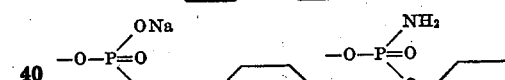

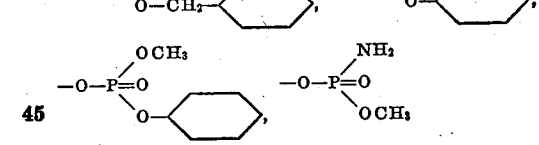

and

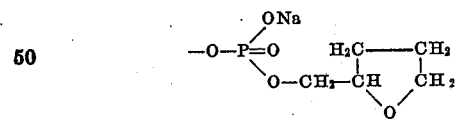

for example.

Similarly, by a "thiophosphoric acid ester group" we include the thiophosphoric acid ester groups corresponding to the phosphoric acid ester groups just given, for example. The formulae for these thiophosphoric acid ester groups are obtained by replacing the double bonded oxygen atom attached to phosphorus, in the above formulae given for representative phosphoric acid ester groups, with an atom of sulfur.

The azo dye compounds of our invention may be prepared in a number of ways. They may be prepared, for example, by diazotizing a primary amine of the benzene or naphthalene series containing a phosphoric acid ester or a thiophosphoric acid ester group attached to the nucleus through an aliphatic ether linkage and coupling the diazonium compound resulting with a suitable aromatic, heterocyclic or hydroaromatic coupling component. In accordance with another method of preparation, a diazotizable aromatic amine is diazotized and coupled with a coupling component of the benzene or naphthalene series containing a phosphoric acid ester or thiophosphoric acid ester group attached to the nucleus through an aliphatic ether linkage. From the foregoing, it will be seen that the phosphoric acid ester or thiophosphoric acid ester group may be present in the diazo component or the coupling component. Further, diazo and coupling components each of which contains a phosphoric acid ester or thiophosphoric acid ester group attached to the nucleus through an aliphatic ether linkage may be employed in the preparation of the azo dye compounds of our invention.

A still further method by which the azo dye compounds of our invention may be prepared is to introduce a phosphoric acid ester or thiophosphoric acid ester group into an azo dye compound not containing such a group. Briefly this may be done by treating an azo dye compound containing a hydroxyaliphatic group linked to an aryl nucleus through an oxygen atom which is a substituent of the aryl nucleus with a suitable phosphating or thiophosphating agent. Ordinarily the first two methods of preparation will be employed and it is principally in connection with them that the preparation of the compounds of our invention will be illustrated.

The azo dye compounds of our invention have the general formula: $R-N=N-R_1$ wherein R represents a member selected from the group consisting of an aryl nucleus of the benzene series and an aryl nucleus of the naphthalene series containing a phosphoric acid ester or a thiophosphoric acid ester group attached to an aliphatic radical containing at least two carbon atoms which is joined to said aryl nucleus through an oxygen atom which is a nuclear substituent of the aryl nucleus and wherein $R_1$ represents the residue of an aromatic, hydroaromatic or heterocyclic nucleus. When $R_1$ is an aromatic residue, it may be an aryl nucleus of the benzene or naphthalene series containing a phosphoric acid ester or a thiophosphoric acid ester group attached to an aliphatic radical containing at least two carbon atoms which is joined to said aryl nucleus through an oxygen atom which is a nuclear substituent of the aryl nucleus.

It should be noted that while our invention is concerned primarily with monoazo dye compounds polyazo dye compounds are likewise included within the scope of our invention as will be more fully apparent hereinafter. $R_1$ in the above general formula, for example, may include aromatic components containing an azo bond.

The aliphatic linkage joining the phosphoric acid ester or the thiophosphoric acid ester group to the oxygen atom may be varied. It may be an unsubstituted hydrocarbon linkage containing at least two carbon atoms such as

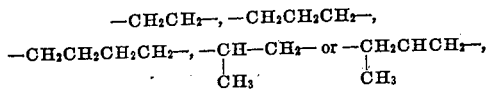

for example, a substituted hydrocarbon linkage such as

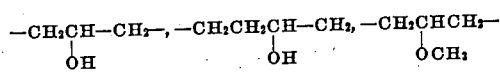

or

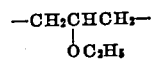

and linkages such as

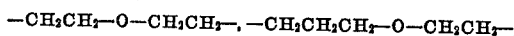
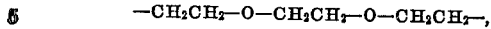
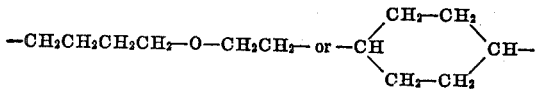

for example. The particular aliphatic linkages given are intended to be illustrative and not limitative of the invention.

While our invention in its broader aspects includes the azo compounds represented by the above general formula, it relates more particularly to monoazo compounds wherein R and $R_1$ each represents an aryl nucleus of the benzene series containing but one benzene nucleus and in which only one of the radicals R and $R_1$ has a phosphoric acid ester or a thiophosphoric acid ester group attached to an aliphatic radical containing at least two carbon atoms which is joined to its nucleus through an oxygen atom which is a nuclear substituent thereof.

For the dyeing of organic derivatives of cellulose such as cellulose acetate silk, we have found that the nuclear non-sulfonated monoazo compounds devoid of a carboxylic acid group wherein R and $R_1$ each represents an aryl nucleus of the benzene series containing but one benzene nucleus and in which only one of the radicals R and $R_1$ has a phosphoric acid or a thiophosphoric acid ester group attached to an aliphatic radical containing at least two carbon atoms which is joined to its nucleus through an oxygen atom which is a nuclear substituent thereof are generally advantageous. Again, generally speaking, it is advantageous that the aliphatic linkage be an unsubstituted hydrocarbon linkage containing at least two carbon atoms such as those given above or a linkage such as

wherein $n$ represents a small whole number such as 1, 2, 3, etc. It will be appreciated, however, that there may be some exceptions to the general rule just set forth. Further, the above generalization is not to be interpreted as meaning that compounds included within the scope of our invention but falling without the above definition cannot be employed to dye organic derivatives of cellulose. In this connection we have noted that compounds wherein one of the radicals R and $R_1$ is an aryl nucleus of the benzene series but in which the other is a naphthalene nucleus, often yield dyeings on organic derivatives of cellulose which are satisfactory as regards color but these dyeings are ordinarily not nearly as light fast as those produced by compounds wherein R and $R_1$ are as above defined.

The dye compounds of our invention possess a wide range of solubility in water, varying from those practically insoluble or relatively insoluble to those having a relatively high solubility in water. Many of the compounds are sufficiently water soluble that they may be applied directly from an aqueous solution to the material being dyed or colored without the use of a dispersing or solubilizing agent. It should be noted, however, that those compounds having a relatively high water-solubility have less affinity for organic derivatives of cellulose than those not having such a relatively high water solubility. While it is difficult to set forth a generalization in this connection, we have observed that the dyes having a solubility in water exceeding about 1% by weight generally do not have as good an affinity as those having a solubility in water less than about 1%.

The water solubility of the azo dye compounds of our invention as will be readily understood is dependent on a variety of factors. The presence of certain salt forming atoms or radicals such as Na, K, or $NH_4$ increases the solubility of the compounds in water. To illustrate, compounds wherein one or more of the hydrogen atoms of the phosphoric acid ester or thiophosphoric acid ester group are replaced by an alkali metal such as sodium or potassium or the ammonium radical are more water-soluble than the corresponding compounds wherein the hydrogen atoms are not replaced or are replaced, for example, with an alkyl or an aryl radical. Similarly, in the case of compounds wherein the phosphoric acid ester or thiophosphoric acid ester group is attached to the oxygen atom through an unsubstituted hydrocarbon linkage, the solubility generally decreases with increase in the number of carbon atoms in the linkage. To illustrate, the compounds wherein the linkage is

are less soluble than the corresponding compounds wherein the linkage is $-CH_2CH_2-$, for example. It will be understood, of course, that the remarks just made with respect to water solubility are merely illustrative and are not intended to be exhaustive. From the foregoing, however, the manner of varying the solubility of the compounds should be readily apparent.

Generally speaking, compounds wherein not more than one of the hydrogen atoms of the phosphoric acid ester or thiophosphoric acid group is replaced with a salt forming atom or radical imparting solubility are better adapted for the dyeing or coloring of organic derivatives of cellulose such as cellulose acetate than those which contain more than one salt forming atom or radical.

The following examples illustrate the preparation of the azo compounds of our invention:

*Example 1*

23.4 grams of

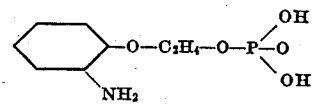

are dissolved in 150 cc. of water to which 25 cc. of 36% hydrochloric acid has been added. The resulting solution is cooled to a temperature of 0–5° C., by the addition of ice for example, and the amine is diazotized while maintaining said temperature by the addition, with stirring, of a water solution of 6.9 grams of sodium nitrite.

14 grams of 5,5-dimethyl-1,3-cyclohexadione are dissolved in 200 cc. of water containing 30 grams of sodium carbonate. The solution resulting is cooled to a temperature approximating 0–10° C. by the addition of ice, for example, and the diazo solution formed above is added, with stirring, while maintaining a temperature of 0–10° C. Upon completion of the coupling reaction which takes place, the dye compound formed is precipitated out by the addition of sodium chloride, recovered by filtration, washed with water and dried. The dye compound obtained has the formula:

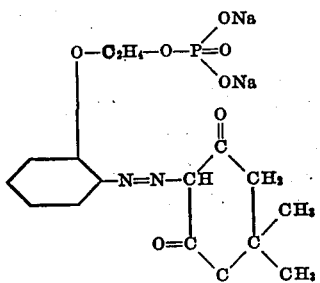

This compound yields greenish-yellow dyeings on silk, wool and cellulose acetate silk.

*Example 2*

0.1 gram mole of

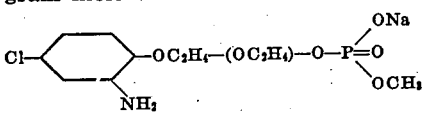

is diazotized in the usual manner and coupled with 10.8 grams of p-cresol dissolved in 100 grams of water containing 15 grams of sodium hydroxide. Upon completion of the coupling reaction, the dye compound formed is precipitated by the addition of sodium chloride, recovered by filtration, washed with water and dried. The dye compound is obtained in the form of its sodium salt and has the formula:

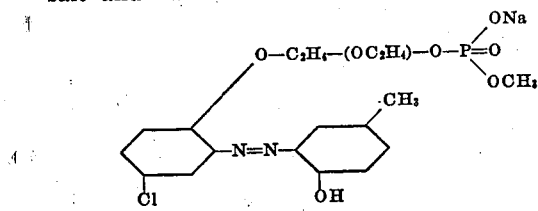

This dye compound colors cellulose acetate, wool and silk yellow.

This dye compound as well as the other dye compounds herein which are produced in salt form may be obtained in the form of a salt other than sodium. The methods by which the other salt forms, such as the potassium, calcium and ammonium salt forms, for example, may be obtained, are well known in the art, and, accordingly, it is not believed necessary to discuss their formation herein. In those cases where two salt forming groups may be present the dye compounds can be prepared in mixed salt form.

*Example 3*

37.6 grams of

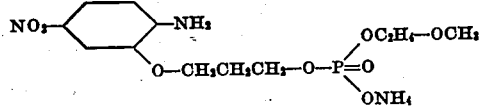

are diazotized and coupled with 16.9 grams of diphenylamine. The dye compound obtained has the formula:

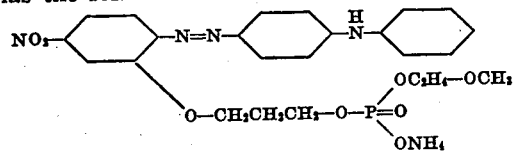

and colors cellulose acetate, wool and silk a red shade.

β-Hydroxyethyldiphenylamine, di-β-hydroxyethylaniline, α-naphthylamine, 2-methoxy-5-methyldiglycerylaniline, 1-amino-2-methyl-5-methoxybenzene and 1-amino-2,5-dimethoxybenzene, for example, may be substituted for diphenylamine in the above example to obtain dye compounds within the scope of our invention.

*Example 4*

30.5 grams of

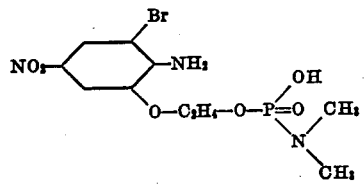

are diazotized and coupled in a dilute hydrochloric acid solution with 16.5 grams of ethyl-β-hydroxyethylaniline. The dye compound obtained has in its sodium salt form the formula:

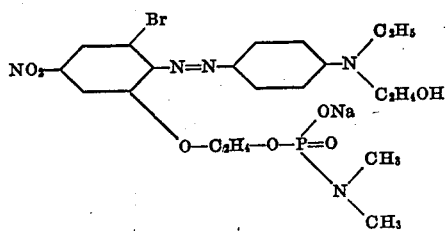

and colors cellulose acetate, wool and silk a reddish-brown shade.

1-phenyl-3-methyl-5-pyrazolone, barbituric acid and γ-hydroxypropylcyclohexyl-m-methoxyaniline, for example, may be substituted for the ethyl-β-hydroxyethylaniline of the example to obtain dye compounds within the scope of our invention.

*Example 5*

31 grams of

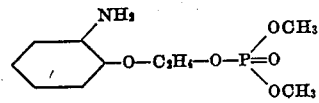

are diazotized and coupled in a dilute aqueous hydrochloric acid solution with 14.3 grams of α-naphthylamine. The dye compound obtained colors cellulose acetate silk, wool and silk orange-yellow.

*Example 6*

32.8 grams of

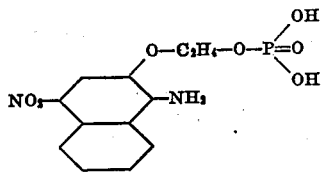

are diazotized and coupled in glacial acetic acid with 21.5 grams of di-β-hydroxyethyl-α-naphthylamine. The dye compound in its sodium salt form has the formula:

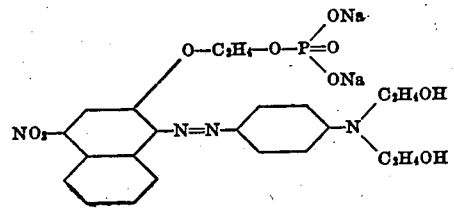

and colors cellulose acetate, wool and silk a rubine shade.

Example 7

34.4 grams of

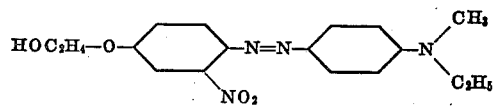

are dissolved in pyridine and treated in the cold with one equivalent of phosphorous oxychloride or phosphoric anhydride. The reaction mixture resulting is then hydrolyzed by warming with sodium bicarbonate or sodium carbonate and poured into water. The dye compound formed is precipitated by the addition of sodium chloride, recovered by filtration, washed with water and dried. The dye compound obtained has the formula:

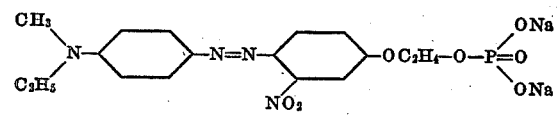

and colors cellulose acetate, wool and silk an orange shade.

Example 8

30.4 grams of

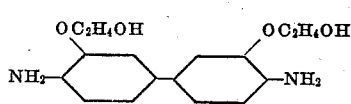

are dissolved in a 20% aqueous hydrochloric acid solution and tetrazotized with 13.8 grams of sodium nitrite.

The diazo solution thus prepared is coupled with 34.2 grams of dimethyl-α-naphthylamine dissolved in a dilute aqueous hydrochloric acid solution. The dye compound obtained from the coupling reaction may be phosphated in accordance with the method described in Example 7 to obtain a dye compound in which one or both of the hydrogen atoms of the hydroxy groups of the β-hydroxyethoxy groups in the 3 and 3' positions of the diphenyl nucleus may be replaced with a phosphoric acid ester grouping. The dye compounds thus obtained color silk and wool an orange shade.

Example 9

33 grams of

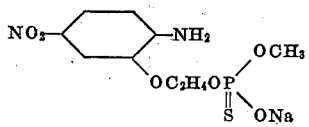

are diazotized and coupled with 12.1 grams of dimethylaniline. The dye compound obtained colors cellulose acetate silk, wool and silk a red shade.

Example 10

12.8 grams of o-chloroaniline are diazotized and the diazonium compound resulting is coupled with 28 grams of

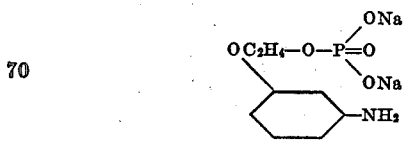

The resulting dye compound colors cellulose acetate silk, wool and silk a yellow shade.

Example 11

13.5 grams of p-aminoacetophenone are diazotized and the diazonium compound resulting is coupled with 36.3 grams of

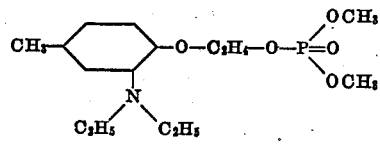

The dye compound obtained colors cellulose acetate an orange shade.

Example 12

13.8 grams of p-nitroaniline are diazotized and the diazonium compound obtained is coupled with 32 grams of

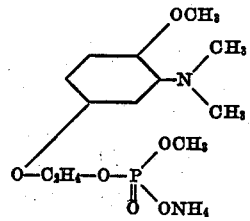

The dye compound obtained in accordance with this example colors cellulose acetate silk, wool and silk a rubine shade. If desired, the dye compound may be hydrolyzed to obtain the free acid formed and then treated with ammonia, pyridine, diethanolamine, triethylamine or calcium hydroxide, for example, to obtain the corresponding salts.

Example 13

22.8 grams of 2,4,6-trinitroaniline are diazotized and the diazonium compound formed is coupled with 33.5 grams of

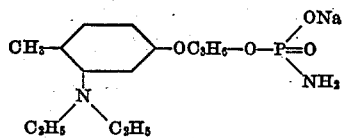

The dye compound obtained colors cellulose acetate silk, wool and silk a blue shade.

Example 14

17.3 grams of 1-amino-2-chloro-4-nitrobenzene are diazotized and the diazonium compound formed is coupled with 37.4 grams of

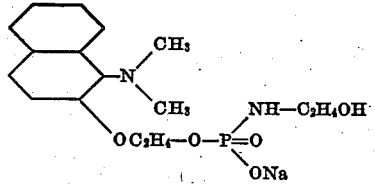

The dye compound obtained colors cellulose acetate silk and wool a violet shade.

Example 15

46 grams of

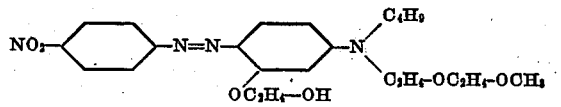

are dissolved in pyridine and treated with 0.1 mol. of

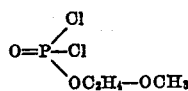

The reaction which takes place is completed by warming on a steam bath. Sodium bicarbonate dissolved in water is then added and when hydrolysis is complete, the pyridine is distilled off and the residue is dissolved in boiling water and filtered while hot. The dye compound formed is precipitated from the cooled filtrate by the addition of sodium chloride, recovered by filtration, washed with water and dried. It has the formula:

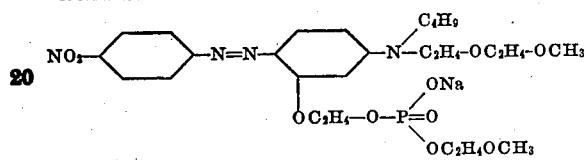

and colors cellulose acetate, wool and silk a red shade.

*Example 16*

12.1 grams of 1-amino-4-methylaminoanthraquinone are added to 110 grams of a 10% sulfuric acid solution and diazotized in the usual manner by the addition, with stirring, of 3.4 grams of sodium nitrite.

23 grams of

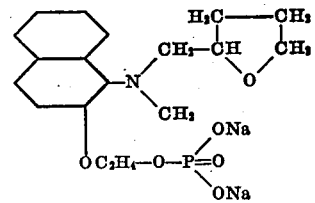

are dissolved in dilute hydrochloric acid and the resulting solution is cooled. The diazo solution prepared above is then added with stirring. Coupling is effected by neutralizing free mineral acid present with sodium acetate, for example. When coupling is complete, the dye is precipitated from solution by the addition of sodium chloride, recovered by filtration, washed and dried. The dye compound obtained colors cellulose acetate and wool a purple shade.

The following tabulation further illustrates the compounds of our invention, together with the color they produce on cellulose acetate silk. The compounds indicated below may be prepared by diazotizing the amines listed under the heading "Amine" and coupling the diazonium compounds formed with the compounds specified in the column entitled "Coupling component." The diazotization and coupling reactions may, for example, be carried out following the general procedure described in Examples 1–16, inclusive.

| Amine | Coupling component | Color on cellulose acetate silk |
|---|---|---|
| o-Chloroaniline | (1) [structure] | Yellow. |
| Do. | (2) [structure] | Do. |
| Do. | (3) [structure] | Do. |
| Do. | (4) [structure] | Do. |
| Do. | (5) [structure] | Red. |

| Amine | Coupling component | Color on cellulose acetate silk |
|---|---|---|
| o-Chloroaniline | (6) Benzene ring with $OC_2H_5$, $N(CH_3)_2$, and $O-C_2H_4-O-P(=S)(OCH_3)(ONa)$ substituents | Yellow. |
| Do | (7) $CH_3$-benzene with $N(C_2H_4OH)_2$ and $O-C_2H_4-O-C_2H_4-O-P(=S)(ONa)(NH_2)$ | Do. |
| Do | (8) Naphthalene with HO-, $N(C_2H_4OH)_2$, and $O-C_2H_4-O-P(=S)(ONa)_2$ substituents | Red. |
| Do | (9) Benzene with $N(C_2H_5)(CH_3)$ and $OC_2H_4-O-P(=S)(ONa)(O-cyclohexyl)$ | Yellow. |
| p-Aminoacetophenone | 1–9 above | Green-yellow to rubine. |
| p-Nitroaniline | do | Green-yellow to blue. |
| p-Nitro-o-chloroaniline | do | Do. |
| p-Nitro-o-methoxyaniline | do | Do. |
| p-Nitro-o-methylaniline | do | Green-yellow to reddish-blue. |
| o-Nitro-p-carbmethoxyaniline | do | Do. |
| p-Aminoazobenzene | do | Do. |
| 4-nitro-α-naphthylamine | do | Do. |
| p-Aminophenylmethyl sulphone | do | Green-yellow to violet. |
| Benzene ring with $NO_2$, Cl, $NH_2$, and $O-C_2H_4-O-P(=O)(ONa)_2$ substituents | (10) Barbituric acid | Green-yellow. |
| Do | (11) 5,5-dimethyl-1,3-cyclohexadione | Do. |
| Do | (12) 1-phenyl-3-methyl-5-pyrazolone | Orange-yellow. |
| Do | (13) p-Cresol | Yellow. |
| Do | (14) Acetoacetanilide | Do. |
| Do | (15) Dibutylaniline | Brownish-red. |
| Do | (16) Ethyl-β-hydroxyethylaniline | Do. |
| Do | (17) Naphthalene with NH-$C_2H_4OH$ and OH substituents | Blue. |
| Do | (18) Benzene with $N(C_2H_5)(CH_2CH(CH_3)CH_2CH_3)$ | Brownish-red. |

| Amine | Coupling component | Color on cellulose acetate silk |
|---|---|---|
| 5. $NH_2$—⟨benzene⟩—O—$CH_2CH_2CH_2$—O—P(=O)(OCH$_3$)(ONH$_4$) | 10–18 above | Green-yellow to red. |
| Cl—⟨benzene⟩—$NH_2$, O—$C_2H_4$—O—$C_2H_4$—O—P(=O)(ONa)(NH$_2$) | do | Do. |
| 15. $NO_2$—⟨benzene⟩—$NH_2$, O—$C_2H_4$—O—P=O (OH—Pyridine)$_2$ | do | Green-yellow to blue. |
| 20. $NO_2$—⟨benzene⟩—$NH_2$ ($NO_2$), O—$C_2H_4$—P=O(ONa)(O—phenyl) | do | Green-yellow to blue. |
| 25. $NO_2$—⟨benzene⟩—$NH_2$, O—$C_2H_4$—O—P=S(O—phenyl)(ONa) | do | Green-yellow to blue. |
| 30. $NO_2$—⟨benzene⟩—$NH_2$, O—$C_2H_4$—O—$C_2H_4$—O—P=S(ONa)(NH$_2$) | do | Green-yellow to blue. |
| 35. $NO_2$—⟨benzene⟩—$NH_2$ (Cl), O—$CH_2CH_2CH_2CH_2$—O—P=S(ONa)$_2$ | do | Green-yellow to blue. |

It will be understood that the examples given to illustrate the invention are representative and not limitative. A number of suitable aromatic diazonium compounds which may be employed in the preparation of the azo dye compounds of our invention have been disclosed but other aromatic diazonium compounds can be used. The aromatic diazonium compounds shown in our copending application Serial No. 225,198, filed of even date herewith, for example, may be coupled with the benzene or naphthalene coupling components containing a phosphoric acid ester or a thiophosphoric acid ester group attached to an aliphatic radical containing at least two carbon atoms which is joined to the benzene or naphthalene nucleus through an oxygen atom which is a nuclear substituent thereof illustrated herein to give dyes within the scope of our invention. In those cases where the coupling component bears the phosphoric acid ester or thiophosphoric acid ester group it also contains a nuclear amino group which may be substituted or unsubstituted. This nuclear amino group may be substituted, for example, with an alkyl, an aryl, a cycloalkyl or a heterocyclic group.

In order that the preparation of the azo compounds of our invention may be clearly understood, the preparation of coupling components having the general formula:

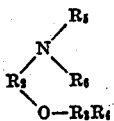

wherein $R_2$ represents the residue of an aryl nucleus of the benzene or naphthalene series, $R_3$ represents an aliphatic radical containing at least two carbon atoms, $R_4$ represents a phosphoric acid ester or a thiophosphoric acid ester group and $R_5$ and $R_6$ each represents hydrogen, an alkyl group, an aryl group or an aralkyl group, will now be further described.

Coupling components of the above general formula may be prepared by subjecting a compound having the general formula:

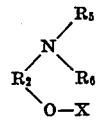

wherein $R_2$, $R_5$ and $R_6$ each have the meaning assigned to them above and X represents a hydroxyaliphatic group containing at least two carbon atoms to treatment with a phosphating agent and, depending on the nature of the phosphating agent and the phosphoric or thiophosphoric acid ester group desired, subjecting the compound thus obtained to hydrolysis or some further treatment. The compounds having the general formula:

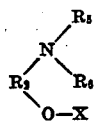

may be prepared in accordance with known methods of preparation.

Similarly, arylamino compounds having the phosphoric acid or thiophosphoric acid ester grouping of our invention which may be diazotized and coupled with a suitable coupling compound to yield compounds of our invention may be prepared by subjecting an arylamine having a hydroxyaliphatic group, containing at least two carbon atoms, linked to the aryl nucleus through oxygen to treatment with a phosphating agent and, depending on the nature of the phosphating agent and the phosphoric or thiophosphoric acid ester group desired, subjecting the compound thus obtained to hydrolysis or some further treatment.

Suitable phosphating agents include, for example, phosphorus oxychloride, $POCl_3$, phosphorus oxybromide, $POBr_3$, phosphoric acid, $H_3PO_4$, phosphoric anhydride, $P_2O_5$, phosphorus sulfochloride, $PSCl_3$, phosphorus sulfobromide, $PSBr_3$, and phosphorus pentasulfide, $P_2S_5$. The use of phosphorus oxychloride and phosphoric acid, for example, is shown in Examples 7 and 8.

Compounds having the general formula:

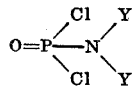

wherein Y represents hydrogen or an alkyl group such as methyl or ethyl may likewise be used as phosphating agents. The use of

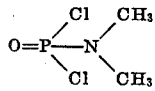

is shown in Example 5 of our copending application Serial No. 225,198 filed of even date. This phosphating agent can be similarly employed in our present invention.

Compounds of the general formula:

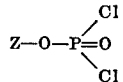

wherein Z is an aryl nucleus may also be employed as phosphating agents. The general manner of using such phosphating compounds is shown in Examples 8 and 10 of our copending application Serial No. 225,198 filed of even date wherein the use of phenyl phosphoryl chloride,

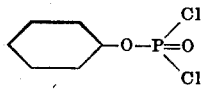

is disclosed. Thiophosphoric compounds corresponding to the phosphoric compounds just given, such as

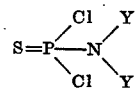
and

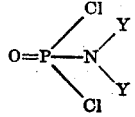

for example, wherein Y and Z have the meaning above assigned to them may likewise be employed as phosphating agents.

Phosphating compounds having the general formula:

wherein Y represents hydrogen or an alkyl group may be prepared by reacting in equal molar proportions, phosphorus oxychloride with a compound having the general formula:

$$HN\begin{matrix}Y\\Y\end{matrix}$$

wherein Y represents hydrogen or an alkyl group. Phosphorus oxychloride can be reacted, for example, with ammonia, methylamine, ethylamine, dimethylamine and ethanolamine to obtain

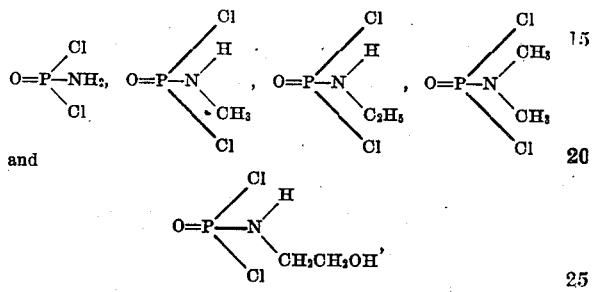

respectively. The corresponding thiophosphoric compounds can be obtained by substituting phosphorus sulfochloride for phosphorus oxychloride.

Phosphating compounds having the general formula:

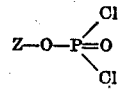

wherein Z is an aryl nucleus, can be prepared by reacting phosphorus oxychloride with a hydroxyaryl compound in equal molar proportions. Suitable hydroxyaryl compounds include phenol and naphthol. By the substitution of a hydroxyalkyl, a hydroxycycloalkyl or a hydroxyaralkyl compound such as methyl alcohol, ethyl alcohol, cyclohexanol and benzyl alcohol for a hydroxyaryl compound, compounds wherein Z is alkyl, cycloalkyl or aralkyl can likewise be prepared. Further, by the substitution of phosphorus sulfochloride for phosphorus oxychloride, the corresponding thiophosphoric compounds can be prepared.

The general method of preparing the phosphating agents will be further clarified by reference to our said copending application Serial No. 225,198 wherein the preparation of

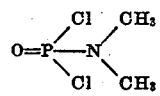

phenyl phosphoryl chloride, amyl thiophosphoryl chloride and ethylaminophosphoryl chloride is described. The preparation of other phosphating agents is also indicated in the descriptive material pertaining to the preparation of the latter three compounds just mentioned.

The azo compounds of our invention which are water-soluble may be employed for the direct coloration of organic derivatives of cellulose, silk and wool or mixtures of these materials without the necessity of using a dispersing or solubilizing agent. The dyeing operations will be conducted in accordance with the usual dyeing practice, salt being added if desired to facilitate exhaustion of the dyebath. For a more detailed description as to how the water-soluble azo dyes of our invention may be employed for the coloration of the above materials, reference may be had to our U. S. Patent No. 2,107,898, issued February 8, 1938. The azo dyes of our invention which are water-insoluble or relatively so will ordinarily be applied to the material to be dyed or colored in the form of an aqueous suspension which can be prepared by grinding the dye to a paste in the presence of soap or other suitable dispersing agent and dispersing the resulting paste in water. For a more detailed description as to how the water-insoluble azo dyes of our invention may be employed for the coloration of the above materials, reference may be had to our U. S. Patent No. 2,108,824, issued February 22, 1938.

It will be noted that while the azo dye compounds of our invention have been illustrated only in connection with compounds having either a phosphoric or a thiophosphoric acid ester group attached thereto in the manner stated, both of these groups may be present and azo dye compounds containing both of these groups are included within the scope of our invention. The preparation of these latter compounds is readily apparent from the foregoing description.

Further, it should be noted that in those instances where the hydroxyaliphatic group of a compound being subjected to a phosphating treatment contains more than one hydroxy group, one or more of said hydroxy groups may have the hydrogen atom replaced with a phosphoric or a thiophosphoric acid ester group. Normally, however, as previously noted, the dye compounds of our invention contain but one phosphoric or thiophosphoric acid ester group.

We claim:

1. The azo dye compounds containing an aryl nucleus selected from the group consisting of an aryl nucleus of the benzene series and an aryl nucleus of the naphthalene series which said aryl nucleus has a member selected from the group consisting of a phosphoric acid ester group and a thiophosphoric acid ester group attached to an aliphatic radical containing at least two carbon atoms which is joined to said aryl nucleus through an oxygen atom which is a nuclear substituent of the aryl nucleus.

2. The azo dye compounds having the general formula: R—N=N—R₁ wherein R represents a member selected from the group consisting of an aryl nucleus of the benzene series and an aryl nucleus of the naphthalene series containing a phosphoric acid ester or a thiophosphoric acid ester group attached to an aliphatic radical containing at least two carbon atoms which is joined to said aryl nucleus through an oxygen atom which is a nuclear substituent of the aryl nucleus and wherein R₁ represents the residue of a member selected from the group consisting of an aromatic nucleus, a hydroaromatic nucleus and a heterocyclic nucleus.

3. The azo dye compounds having the general formula: R—N=N—R₁ wherein R represents an aryl nucleus of the benzene series containing a member selected from the group consisting of a phosphoric acid ester group and a thiophosphoric acid ester group attached to an aliphatic radical containing at least two carbon atoms which is joined to said aryl nucleus through an oxygen atom which is a nuclear substituent of the aryl nucleus and wherein R₁ represents the residue of a member selected from the group consisting of an aromatic nucleus, a hydroaromatic nucleus and a heterocyclic nucleus.

4. The azo dye compounds having the general formula: R—N=N—R₁ wherein R represents a member selected from the group consisting of an aryl nucleus of the benzene series and an aryl nucleus of the naphthalene series containing a phosphoric acid ester group or a thiophosphoric acid ester group attached to an aliphatic radical containing at least two carbon atoms which is joined to said aryl nucleus through an oxygen atom which is a nuclear substituent of the aryl nucleus and wherein R₁ represents the residue of an aryl nucleus of the benzene series.

5. The azo dye compounds having the general formula: R—N=N—R wherein each R represents the residue of an aryl nucleus of the benzene series and wherein at least one of said aryl nuclei contains a member selected from the group consisting of a phosphoric acid ester group and a thiophosphoric acid ester group attached to an aliphatic radical containing at least two carbon atoms which is joined to its nucleus through an oxygen atom which is a nuclear substituent thereof.

6. The azo dye compounds containing an aryl nucleus of the benzene series which said aryl nucleus has a member selected from the group consisting of a phosphoric acid ester group and a thio-phosphoric acid ester group attached to an aliphatic radical containing at least two carbon atoms which is joined to said aryl nucleus through an oxygen atom which is a nuclear substituent of the aryl nucleus.

7. The azo dye compounds containing an aryl nucleus of the benzene series which said aryl nucleus has a phosphoric acid ester group attached to an aliphatic radical containing at least two carbon atoms which is joined to said aryl nucleus through an oxygen atom which is a nuclear substituent of the aryl nucleus.

8. The azo dye compounds having the general formula: R—N=N—R₁—O—X—P wherein R represents the residue of a member selected from the group consisting of an aromatic nucleus, a hydroaromatic nucleus and a heterocyclic nucleus, R₁ represents the residue of a member selected from the group consisting of an aryl nucleus of the benzene series and an aryl nucleus of the naphthalene series, X represents an aliphatic linkage selected from the group consisting of an unsubstituted saturated hydrocarbon linkage containing at least two carbon atoms and a —C₂H₄—(OC₂H₄)ₙ— linkage, wherein n represents a small whole number, and P represents a member selected from the group consisting of a phosphoric acid ester group and a thiophosphoric acid ester group.

9. The azo dye compounds having the general formula: R—N=N—R₁—O—X—P wherein R and R₁ each represents the residue of an aryl nucleus of the benzene series, X represents an aliphatic linkage selected from the group consisting of an unsubstituted saturated hydrocarbon linkage containing at least two carbon atoms and a —C₂H₄—(OC₂H₄)ₙ— linkage, wherein n represents a small whole number, and P represents a phosphoric acid ester group.

10. The process of coloring material made of or containing an organic derivative of cellulose which comprises applying thereto a nuclear non-sulfonated azo dye compound containing an aryl nucleus selected from the group consisting of an aryl nucleus of the benzene series and an aryl nucleus of the naphthalene series which said aryl nucleus has a member selected from the group consisting of a phosphoric acid ester group and a thiophosphoric acid ester group attached to an aliphatic radical containing at least two carbon atoms which is joined to said aryl nucleus through an oxygen atom which is a nuclear substituent of the aryl nucleus.

11. The process of coloring material made of or containing an organic derivative of cellulose which comprises applying thereto a nuclear non-sulfonated azo dye compound having the general formula: R—N=N—R₁ wherein R represents a member selected from the group consisting of an aryl nucleus of the benzene series and an aryl nucleus of the naphthalene series containing a phosphoric acid ester or a thio-phosphoric acid ester group attached to an aliphatic radical containing at least two carbon atoms which is joined to said aryl nucleus through an oxygen atom which is a nuclear substituent of the aryl nucleus and wherein R₁ represents the residue of a member selected from the group consisting of an aromatic nucleus, a hydroaromatic nucleus and a heterocyclic nucleus.

12. The process of coloring a material made of or containing an organic derivative of cellulose which comprises applying thereto a nuclear non-sulfonated azo dye compound having the general formula: R—N=N—R wherein each R represents the residue of an aryl nucleus of the benzene series and wherein at least one of said aryl nuclei contains a member selected from the group consisting of a phosphoric acid ester group and a thiophosphoric acid ester group attached to an aliphatic radical containing at least two carbon atoms which is joined to its nucleus through an oxygen atom which is a nuclear substituent thereof.

13. The process of coloring a cellulose acetate which comprises applying thereto a nuclear non-sulfonated azo dye compound containing an aryl nucleus of the benzene or naphthalene series which said aryl nucleus has a member selected from the group consisting of a phosphoric acid ester group and a thiophosphoric acid ester group attached to an aliphatic radical containing at least two carbon atoms which is joined to said aryl nucleus through an oxygen atom which is a nuclear substituent of the aryl nucleus.

14. The process of coloring a cellulose acetate which comprises applying thereto a nuclear non-sulfonated azo dye compound having the general formula: R—N=N—R₁ wherein R represents a member selected from the group consisting of an aryl nucleus of the benzene series and an aryl nucleus of the naphthalene series containing a phosphoric acid ester or a thio-phosphoric acid ester group attached to an aliphatic radical containing at least two carbon atoms which is joined to said aryl nucleus through an oxygen atom which is a nuclear substituent of the aryl nucleus and wherein R₁ represents the residue of a member selected from the group consisting of an aromatic nucleus, a hydroaromatic nucleus and a heterocyclic nucleus.

15. The process of coloring a cellulose acetate which comprises applying thereto a nuclear non-sulfonated azo dye compound having the general formula: R—N=N—R₁ wherein R represents a member selected from the group consisting of an aryl nucleus of the benzene series and an aryl nucleus of the naphthalene series containing a phosphoric acid ester group or a thiophosphoric acid ester group attached to an aliphatic radical containing at least two carbon atoms which is joined to said aryl nucleus through an oxygen atom which is a nuclear substituent of the aryl nucleus and wherein R₁ represents the residue of an aryl nucleus of the benzene series.

16. The process of coloring a cellulose acetate which comprises applying thereto a nuclear non-sulfonated azo dye compound having the general formula: R—N=N—R wherein each R represents a member selected from the group consisting of an aryl nucleus of the benzene series and an aryl nucleus of the naphthalene series containing a phosphoric acid ester group or a thiophosphoric acid ester group attached to an aliphatic radical containing at least two carbon atoms which is joined to said aryl nucleus through an oxygen atom which is a nuclear substituent of the aryl nucleus and wherein the remaining R represents the residue of an aryl nucleus of the benzene series.

17. The process of coloring a cellulose acetate which comprises applying thereto a nuclear non-sulfonated azo dye compound having the general formula: R—N=N—R wherein each R represents the residue of an aryl nucleus of the benzene series and wherein at least one of said aryl nuclei contains a phosphoric acid ester group attached to an aliphatic radical containing at least two carbon atoms which is joined to its nucleus through an oxygen atom which is a nuclear substituent thereof.

18. The process of coloring a cellulose acetate which comprises applying thereto a nuclear non-sulfonated azo dye compound having the general formula: R—N=N—R wherein each R represents the residue of an aryl nucleus of the benzene series and wherein at least one of said aryl nuclei contains a member selected from the group consisting of a phosphoric acid ester group and a thiophosphoric acid ester group attached to an aliphatic radical containing at least two carbon atoms which is joined to its nucleus through an oxygen atom which is a nuclear substituent thereof and wherein said azo dye compound has a solubility in water less than about 1% by weight.

JAMES G. McNALLY.
JOSEPH B. DICKEY.